United States Patent Office 3,541,540
Patented Nov. 17, 1970

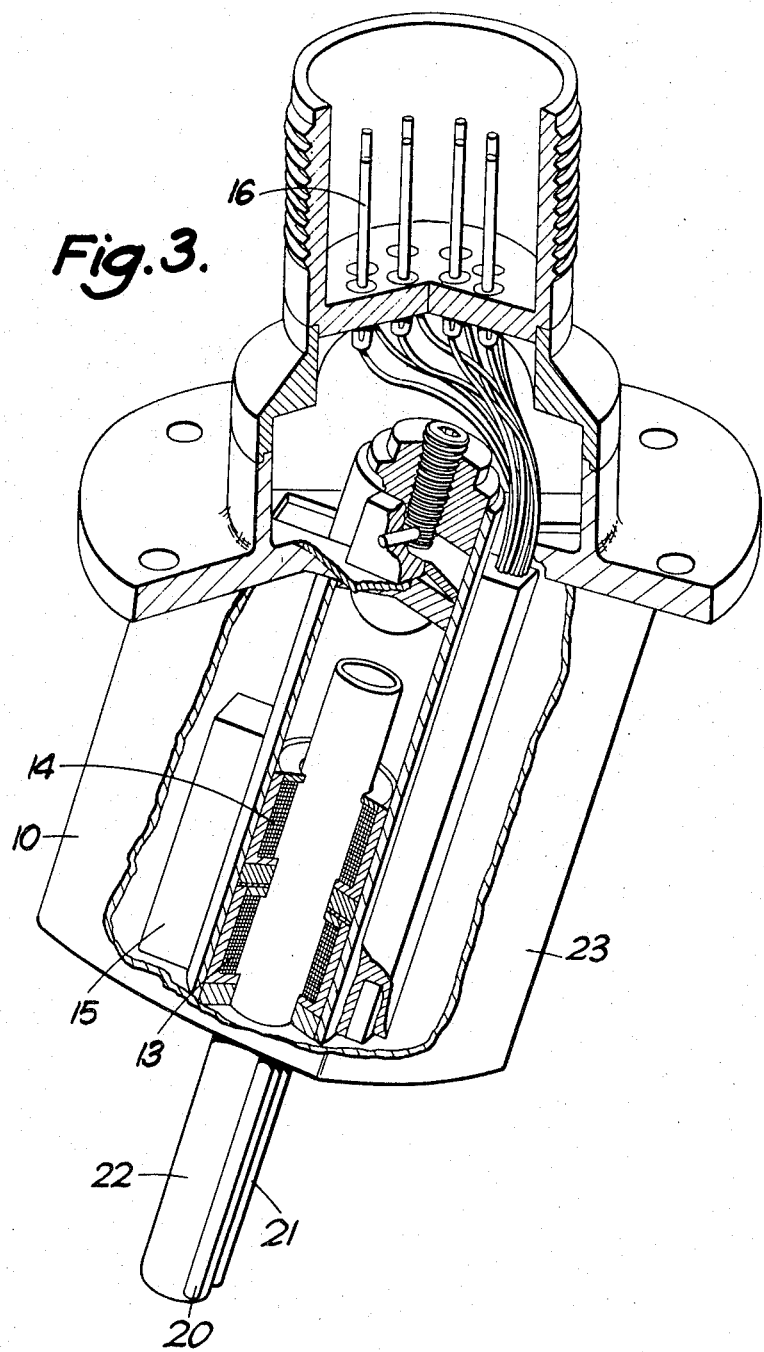

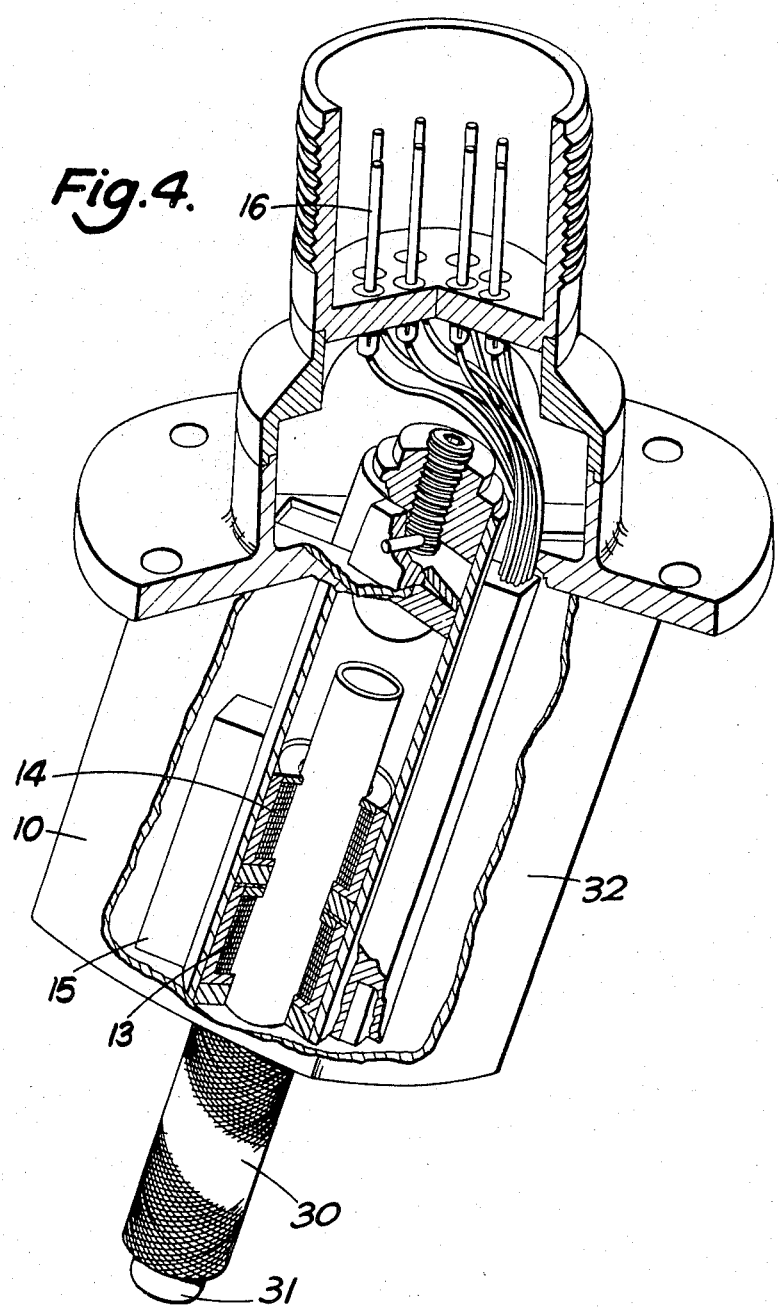

3,541,540
ICE DETECTORS
John Francis Hughes, Bognor Regis, England, assignor to Rosemount Engineering Company Limited, Bognor Regis, England, a British company
Filed July 26, 1968, Ser. No. 747,867
Int. Cl. G08g 5/04, 3/02
U.S. Cl. 340—234
12 Claims

ABSTRACT OF THE DISCLOSURE

An ice detector, of the kind in which the change in resonant frequency of a vibrating element due to ice formation on the element is sensed, has an elongated element vibrating in a torsional or axial mode and is provided with an additional member positioned adjacent the probe so that, when ice forms on the vibrating element, that ice comes into contact with and adheres to the additional member or to ice thereon thereby substantially increasing the loading on the vibrating element.

BACKGROUND OF THE INVENTION

Field of the invention

This invention relates to ice detectors for detecting the formation of ice. Such detectors are used on aircraft but are increasingly being used on fixed structures, e.g. bridges or roads where warning of the onset of ice formation is required.

Description of the prior art

Ice detectors are known of the kind (hereinafter referred to as ice detectors of the kind described) in which an elongated vibrating probe element extends outwardly from a support structure on which the formation of ice is to be detected and wherein means are provided for sensing the change in the resonant frequency of mechanical vibration due to ice loading on the element. Such an ice detector is described for example in the specification of British Pat. No. 1,087,475 (U.S. Ser. No. 409,115 Werner et al. filed Nov. 5, 1964, now Pat. No. 3,341,835, Sept. 12, 1967). The elongated probe element may be operated in an axial or a torsional mode of vibration; in either case it is preferably attached to a nodal support substantially at a node of vibration of the element so as to have a rear portion extending inwardly into the support structure and to have a front portion extending forwardly of this support structure with at least a forward part thereof in the icing environment. Vibrating means may be mounted adjacent to the vibrating element for exciting the whole element into resonant vibration with sensing means adjacent the vibrating element for sensing the response of the vibrating element. A heater may be provided on the vibrating element which is exposed to the icing environment; this heater may be operated cyclically so that ice is periodically removed and the element thereby restored to the condition for detecting the presence of conditions in which ice formation takes place. Preferably however, as is described in aforementioned British Pat. No. 1,087,475, the operation of the heater is controlled by the ice detector so that the heater is switched on only when the vibration frequency of the element has changed by a predetermined amount due to ice accumulation.

SUMMARY OF THE INVENTION

One of the problems with vibrating ice detectors of the kind described above is that, in very light ice conditions, a considerable mass of ice has to be accreted on the probe element before a detectable difference in frequency can be obtained. This makes the use of this type of ice detector difficult when there is very little air velocity over the probe element or where very rapid warning of icing conditions is required.

According to this invention, in an ice detector, an elongated vibrating probe element extends outwardly from a support means for sensing the change in mechanical vibration due to the ice loading of the element and an additional member adjacent the probe is positioned so that, when ice forms on the vibrating probe element, that ice will come into contact with and adhere to the additional member or ice thereon, thereby substantially increasing the loading on the probe element. The additional element may be one or more fixed members secured to the structures supporting the probe element.

In one construction, one or more elongated elements, e.g., rods, are provided extending outwardly from the support structure parallel to and adjacent the probe element. Such members may be heated cyclically or periodically in the same way as the probe element to remove ice accretion.

In another construction the additional member comprises an open work structure extending around the probe element and secured to the support structure around the probe element. This open work structure might, for example, be a wire helix. Such a structure around the probe element does not substantially affect the formation of ice on the probe element. Ice however will accrete on the open work structure and, as soon as there is enough deposited on the open work structure and the probe so that the ice on the probe adheres to the ice on the open work structure, there is a large and sudden change in the resonant frequency of the probe element.

In yet another arrangement there is provided a loose sleeve of flexible material, for example a textile material such as canvas, around the probe element. When no ice is present such a flexible sleeve will cause only very slight loading of the vibratory probe element, particularly if an axial mode of vibration is employed. When ice is present however, it will cause the ice-laden flexible material to bond to the probe element and so produce a large change in the resonant frequency. Such a detector with a flexible sleeve resting over a probe is not suitable for aircraft but finds application particularly for sensing the onset of icing on roads and fixed structures such as bridges.

It will be noted that in all the arrangements described above, when icing occurs, the additional mass of ice is fixed to the supporting structure for the probe. This is true even with the flexible sleeve since, with such a construction, typically an upright probe element would be used and the sleeve would loosely fit around this probe element resting on the support structure for the probe element. When icing occurs, the sleeve will rapidly become secured, by the ice, to the support structure. Thus in all these arrangements the formation of ice may lead to a condition where the probe element is incapable of further vibratory movement and oscillation ceases. This leads to the possibility of using a very simple form of detection circuit determining whether or not oscillation is present. This greatly simplifies the circutry associated with the detection system and provides a system which is inherently fail safe since almost any failure or damage will resort in oscillation ceasing and thereby giving ice warning conditions.

This type of ice detector may also be used as a snow detector. It may be necessary in this case periodically to apply heat to cause the snow to melt and then to allow it to re-freeze so that a detectable ice build-up is produced. For this purpose a heater may be provided. Very conveniently this is constituted by an elongated electrical heating element forming the aforementioned helix around the probe. Such a heating element may be constructed in the manner described in the specification of British Pat. No. 1,031,863.

BRIEF DESCRIPTION OF THE DRAWINGS

In the accompanying drawings:

FIGS. 3 and 4 illustrate two further constructions of ice detector.

DESCRIPTION OF THE PREFERRED EMBODIMENTS

Figures 1, 2:
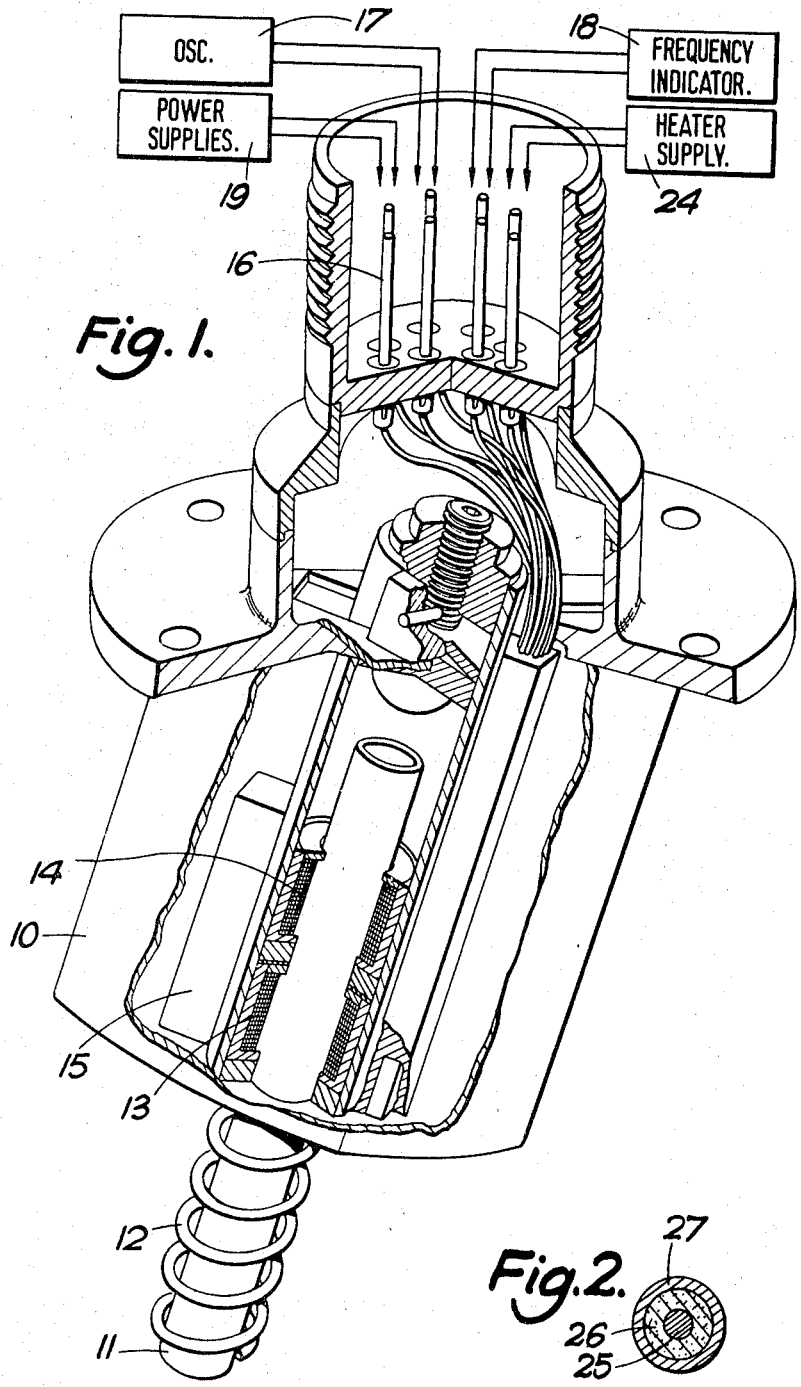
FIG. 1 illustrates a first construction of ice detector.
FIG. 2 is a cross-section through a heating element employed in the construction of FIG. 1.

In each of FIGS. 1, 3 and 4, the ice detector has a housing 10 which is typically a pressure tight metal case through which extends part of an axially vibratable probe element 11. This probe element is secured in the wall of the housing 10 at a nodal point. The probe element and the housing may be constructed in the manner described in the aforementioned British specification No. 1,087,475. This instrument has an axially vibratable tubular probe element around which are magnetic drive coil 13 and a feedback coil 14 bridged by a magnet 15. An oscillator 17 feeds the drive coil 13; the feedback coil 14 forms part of the oscillator circuit; the oscillator provides a signal which is fed back through a connector plug 16 to an external indicator 18. This plug 16 also forms a connection for the power supply 18 and a heater supply circuit 19 to be described later.

In the particular construction of FIG. 1 there is shown a helix 12 arranged around the probe element and secured at its bottom end on the housing 10. In the absence of icing this helix 12 does not affect the vibration of the probe element. When ice builds up however on the helix and probe element, it will eventually get to a thickness such that the ice on the probe element adheres to the helix or to the ice thereon thereby causing a substantial and sudden change in the resonant frequency of the probe element 11 or the cessation of vibration. It will be seen that, since the probe element utilises an axial form of vibration, the helix may be arranged quite closely around it and thus the change in the resonant frequency of the probe element occurs with the formation of a quite thin layer of ice.

For detecting snow, it may be necessary to apply heat periodically to cause the snow to melt and then to allow it to re-freeze so that a detectable ice build-up is produced. For this purpose the helix 12 is formed of a resistance heating element which is shown in section in FIG. 2. This particular heating element is of co-axial construction and is formed, as is described in British patent specification No. 1,031,863 of resistive heating wire 25 within a woven insulating sleeve 26 onto which is drawn a metal outer tube 27. To detect snow, current from the heater supply circuit 24 is periodically fed through the heating element to melt the snow, the heater supply circuit incorporating a suitable time-controlled switch for this purpose. The water is allowed to re-freeze so that an ice build-up occurs on the probe 11.

In FIG. 3 there is shown a modification of the construction of FIG. 1 in which there are provided two rods 20, 21 closely adjacent an axially vibrating probe element 22 which is mounted in the housing 23. With this arrangement, ice will build up on the probe element and the fixed rods and when the ice on the probe element comes into contact with that on one or both fixed rods there will again be a sudden change in the resonant frequency of the probe element.

FIG. 4 illustrates another modification of the construction of FIG. 1 in which a canvas sleeve 30 is placed loosely around an axially vibratable probe element 31 mounted in a housing 32. When icing ocurs, the ice will build up around the canvas sleeve 30 and on the probe element 31. The canvas sleeve 30 will become firmly fixed to the housing 32. In general the canvas sleeve 30 at some point will be very close to the probe element 31 and adhesion will occur due to the ice formation so giving a substantial change in the resonant frequency of the probe element. In the absence of ice conditions, a loose canvas sleeve has negligible effect on the loading of an axially vibrating rod.

In each of the embodiments described above a change of the resonant frequency will occur when ice forms and a detector may be arranged to detect such a change in frequency. However, the system can be arranged so that the damping due to ice forming leads to a cessation of vibration and in this case, a detector may be provided to determine whether or not the element is vibrating.

Although in each of FIGS. 1, 3 and 4 an axially vibrated probe is employed, it is equally suitable to use torsional vibration; in both cases the spacing between the vibrating element and the additional member or members remains constant during the vibrating movement.

I claim:

1. An ice detector comprising an elongated vibrating probe element extending outwardly from a support structure, means for sensing the change in mechanical vibration due to the ice loading of the element and an additional member adjacent the probe positioned so that when ice forms on the vibrating proble element, that ice will come into contact with and adhere to the additional member or to ice thereon, thereby substantially increasing the ice loading on the probe element.

2. An ice detector as claimed in claim 1 wherein said additional member comprises at least one fixed member secured to the structure supporting the probe element.

3. An ice detector as claimed in claim 1 wherein said additional member comprises at least one elongated element extending outwardly from said structure parallel to and adjacent the probe element.

4. An ice detector as claimed in claim 1 wherein said additional member comprisse an open-work structure extending around the probe element and secured to the support structure around the probe element.

5. An ice detector as claimed in claim 4 wherein said open-work structure is a wire helix.

6. An ice detector as claimed in claim 5 wherein said wire helix is formed by an electrical resistance heating element.

7. An ice detector as claimed in claim 1 wherein said additional member is a loose sleeve of flexible material around the probe element.

8. An ice detector as claimed in claim 7 wherein said loose sleeve is formed of a textile material.

9. An ice detector as claimed in claim 1 and wherein said means for sensing the change in the resonant frequency of mechanical vibration due to ice loading on the element comprises a detector for determining whether or not oscillation is present.

10. An ice detector as claimed in claim 1 wherein the probe element is vibrated in an axial mode.

11. An ice detector as claimed in claim 1 wherein the probe is vibrated in a torsional mode.

12. An ice detector as claimed in claim 1 wherein means are provided for heating said additional member.

References Cited

UNITED STATES PATENTS

| 3,341,835 | 9/1967 | Werner et al. | 340—234 |
| 3,240,054 | 3/1966 | Roth | 340—234 |

ROBERT L. GRIFFIN, Primary Examiner

B. LEIBOWITZ, Assistant Examiner

U.S. Cl. X.R.

73—67.1; 244—134